United States Patent
Wang et al.

(10) Patent No.: US 9,630,495 B2
(45) Date of Patent: Apr. 25, 2017

(54) POWER TRANSMISSION CONTROL APPARATUS

(71) Applicant: KWANG YANG MOTOR CO., LTD., Kaohsiung (TW)

(72) Inventors: Chun-Kai Wang, Tainan (TW); Chao-Chang Ho, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 180 days.

(21) Appl. No.: 14/508,542

(22) Filed: Oct. 7, 2014

(65) Prior Publication Data

US 2015/0102784 A1  Apr. 16, 2015

(30) Foreign Application Priority Data

Oct. 11, 2013 (TW) .............................. 102136755 A (51) Int. Cl.
*F16D 11/14* (2006.01)
*B60K 25/02* (2006.01)
*F16D 28/00* (2006.01)

(52) U.S. Cl.
CPC .............. *B60K 25/02* (2013.01); *F16D 11/14* (2013.01); *F16D 28/00* (2013.01); *F16D 2300/18* (2013.01)

(58) Field of Classification Search
CPC ........... F16D 2121/24; F16D 2023/123; F16D 2500/10418; F16D 11/14; Y10T 74/19279; F16H 2063/3053
USPC .............................................. 192/66.32, 84.6
See application file for complete search history.

(56) References Cited

U.S. PATENT DOCUMENTS

| 2,591,338 | A | * | 4/1952 | Cooper | A01K 89/016 |
| | | | | | 242/256 |
| 3,332,303 | A | * | 7/1967 | Daugherty | F16K 31/045 |
| | | | | | 192/138 |
| 5,282,523 | A | * | 2/1994 | Mueller | F02D 11/107 |
| | | | | | 192/139 |
| 6,808,037 | B1 | * | 10/2004 | Mueller | B60K 17/16 |
| | | | | | 180/247 |
| 7,761,207 | B2 | * | 7/2010 | Midorikawa | B60R 22/44 |
| | | | | | 280/807 |
| 2002/0162709 | A1 | * | 11/2002 | Drennen | F16D 65/18 |
| | | | | | 188/72.1 |
| 2012/0175887 | A1 | * | 7/2012 | Chang | F02B 63/04 |
| | | | | | 290/1 R |

\* cited by examiner

*Primary Examiner* — Stacey Fluhart
(74) *Attorney, Agent, or Firm* — Hamre, Schumann, Mueller & Larson, P.C.

(57) ABSTRACT

A power transmission control apparatus is for use with a vehicle that includes a power generator. The device includes a switching unit and a positioning unit. The switching unit includes an electric driving mechanism and an outer shell. The electric driving mechanism includes an electric motor and a gear assembly. The positioning unit includes a position limiting member and an engaging portion that has first and second engaging ends. One gear of the gear assembly is driven by the electric motor to rotate between a non-supplying position, where the position limiting member engages the first engaging end and where the power generator cannot work, and a supplying position, where the position limiting member engages the second engaging end and where the power generator can work.

8 Claims, 10 Drawing Sheets

POWER TRANSMISSION CONTROL APPARATUS

CROSS-REFERENCE TO RELATED APPLICATION

This application claims priority of Taiwanese Application No. 102136755, filed on Oct. 11, 2013.

BACKGROUND OF THE INVENTION

1. Field of the Invention

This invention relates to a control apparatus, and more particularly to a power transmission control apparatus for use with a vehicle having a power generator.

2. Description of the Related Art

Typically, a vehicle capable of supplying electricity to external electric appliances includes an engine having a crankshaft, a power generator spaced apart from the engine, and a power transmitting device. The power transmitting device includes a power transmitting unit for transmitting controllably a power from the crankshaft, and a switching unit for driving the power transmitting unit. The switching unit is operable to switch the power transmitting unit between a supplying state and a non-supplying state. In the non-supplying state, the crankshaft cannot drive the power transmitting unit. In the supplying state, the crankshaft can drive the power transmitting unit to enable the power generator to generate electricity.

Figure 1:
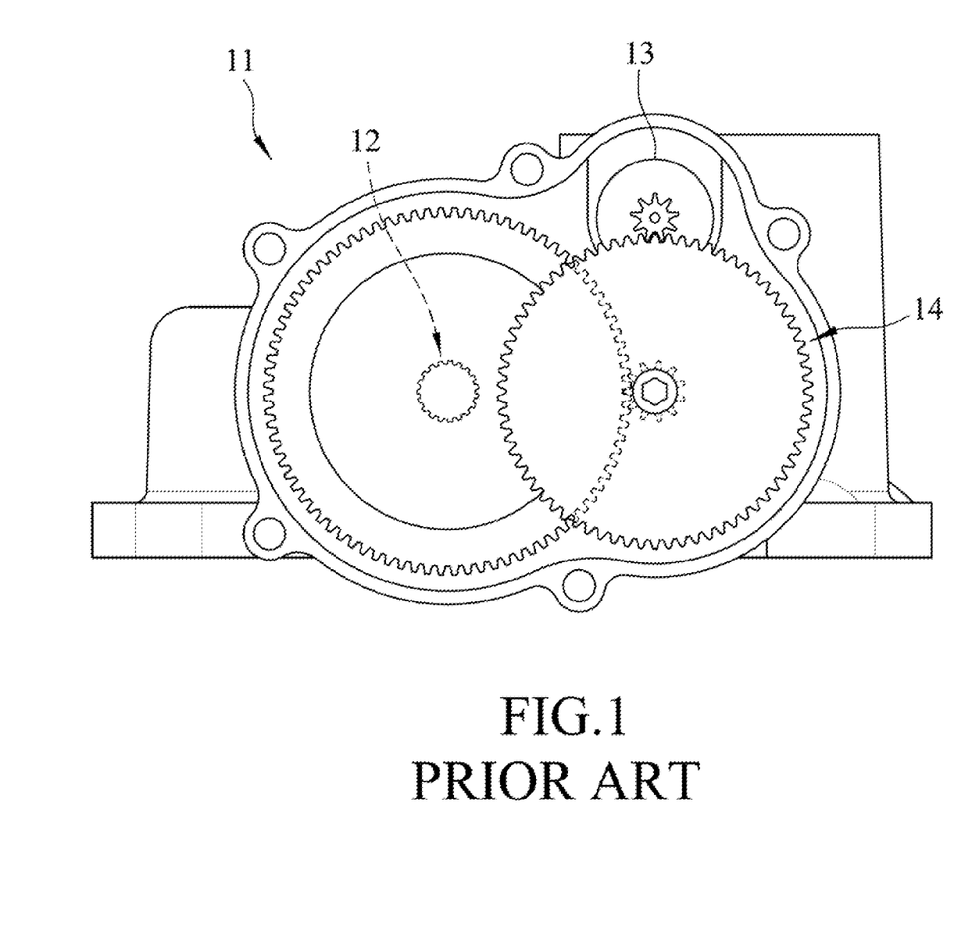
FIG. 1 is a top view of a switching unit of a conventional vehicle power transmission apparatus.

Referring to FIG. 1, the switching unit 11 of the power transmitting device includes a switching rod 12 for driving the power transmitting unit, a stepper motor 13 spaced apart from the switching rod 12, and a gear assembly 14 driven by the stepper motor 13. The stepper motor 13 drives the gear assembly 14 to rotate the switching rod 12 to thereby change the power transmitting unit between the supplying state and the non-supplying state.

The stepper motor 13 is disposed for controlling accurately the rotational angle and position of one of gears of the gear assembly 14 by poise signals to drive rotation of the switching rod 12 between a supplying position and a non-supplying position. In this manner, the switching rod 12 can be positioned accurately. However, the stepper motor 13 is more expensive than a DC motor. Furthermore, if it is desired to adjust the angle and position of the stepper motor 13 or increase the torque and power of the stepper motor 13, the structure of the stepper motor 13 needs to be changed largely, thereby resulting in waste in time and cost.

SUMMARY OF THE INVENTION

The object of this invention is to provide a power transmission control apparatus for a vehicle having a power generator, which can overcome the disadvantages associated with the prior art.

According to this invention, a power transmission control apparatus is for use with a vehicle that includes a power generator. The device includes a switching omit and a positioning unit. The switching unit includes an electric driving mechanism and an outer shell. The electric driving mechanism includes an electric motor and a gear assembly. The positioning unit includes a position limiting member and an engaging portion that has first and second engaging ends. One gear of the gear assembly is driven by the electric motor to rotate between a non-supplying position, where the position limiting member engages the first engaging end and where the power generator cannot work, and a supplying position, where the position limiting member engages the second engaging end and where the power generator can work.

BRIEF DESCRIPTION OF THE DRAWINGS

These and other features and advantages of this invention will become apparent in the following detailed description of the embodiments of this invention, with reference to the accompanying drawings, in which.

DETAILED DESCRIPTION OF THE EMBODIMENTS

Before the present invention is described in greater detail in connection with the embodiments, it should be noted that similar elements and structures are designated by like reference numerals throughout the entire disclosure.

Figure 2:
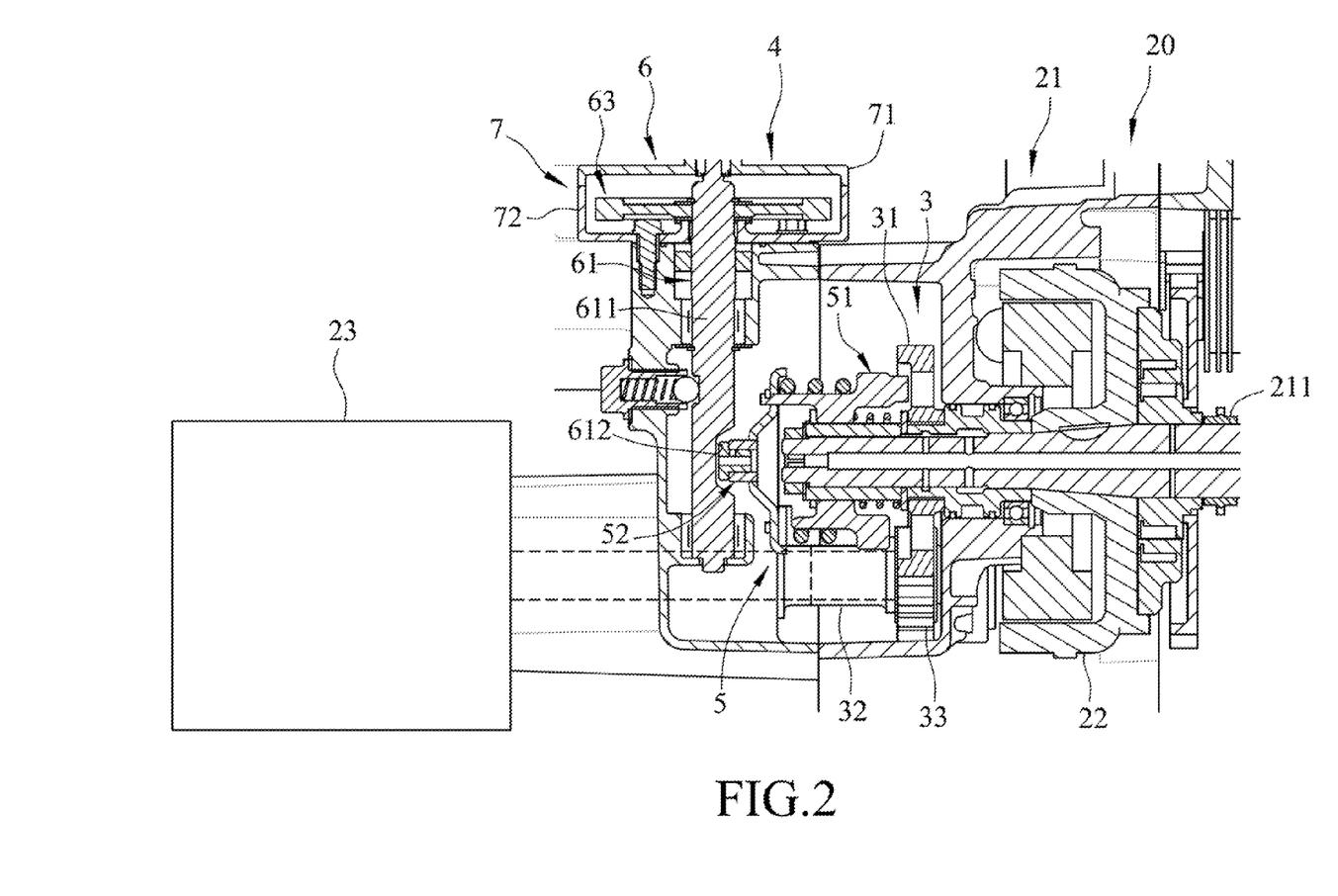
FIG. 2 is a sectional view of the first embodiment of a power transmission control apparatus for a vehicle having a power generator according to this invention, illustrating a non-supplying position of a switching mechanism.
Figure 3:
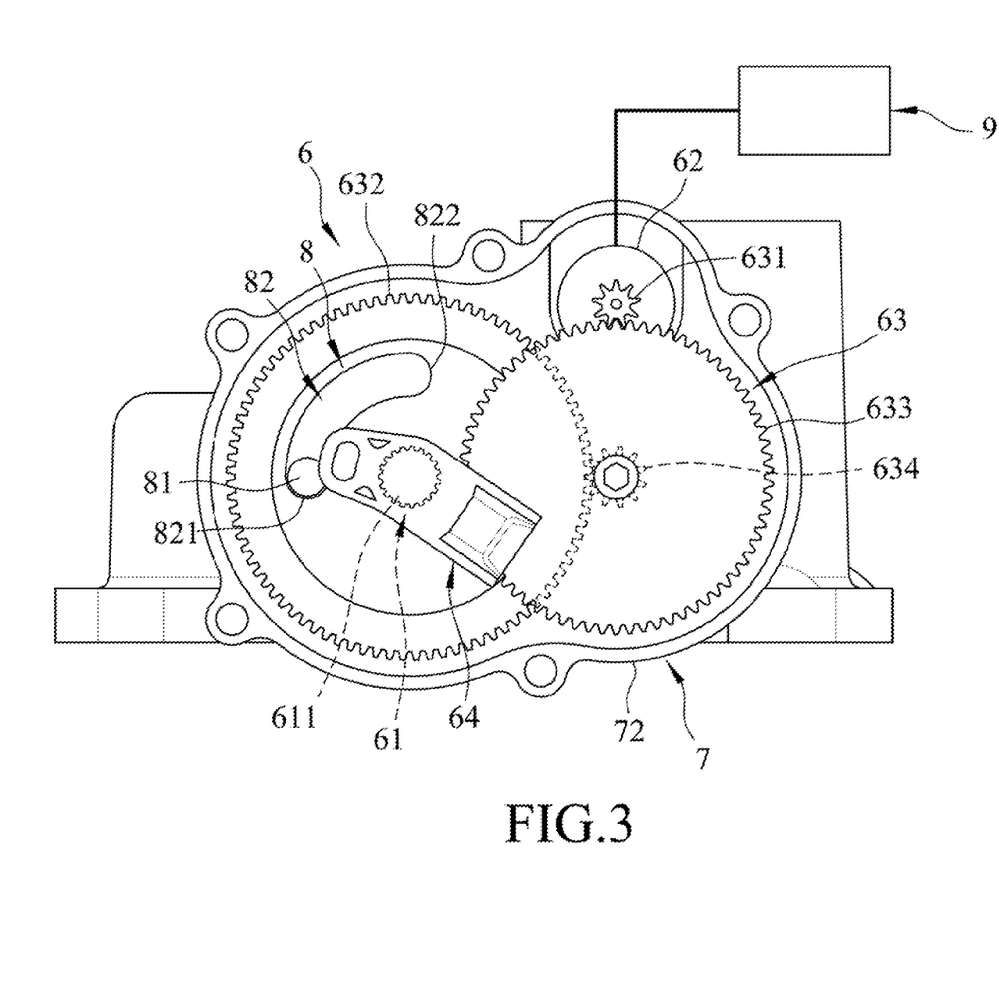
FIG. 3 is a top view of the first embodiment, illustrating that a position limiting member is engaged in a first engaging end of an engaging portion, when the switching mechanism is disposed at the non-supplying position.

Referring to FIGS. 2 and 3, the first embodiment of a power transmission control apparatus is adapted for use with a vehicle 20. The vehicle 20 includes an engine 21 having a crankshaft 211, an alternator 22 disposed on the crankshaft 211, and a power generator 23 accepting controllably a power from the crankshaft 211 for supplying electricity to external electric appliances (not shown). The alternator 22 is used to generate alternating current for charging of a rechargeable battery (not shown).

The power transmission apparatus includes a power transmitting unit 3 for transmitting a power from the crankshaft 211 to the power generator 23, a switching unit 4 operable for controlling activation and deactivation of the power transmitting unit 3, a positioning unit 8 disposed in the switching unit 4, and an electric control unit 9 for controlling operation of the switching unit 4.

The power transmitting unit 3 include a power output gear 31 sleeved rotatably on the crankshaft 211 and formed with a plurality of engaging holes 311 (see FIG. 4), a power transmitting mechanism 32 connected to the power generator 23, and a power transmitting gear 33 meshing with the power output gear 31 and rotatable to activate the power transmitting mechanism 32.

The switching unit 4 includes a switching mechanism 5 connected between the crankshaft 211 and the power transmitting unit 3, an electric driving mechanism 6 operable for driving the switching mechanism 5, and an outer shell 7 receiving the electric driving mechanism 6. The switching mechanism 5 includes a sliding sleeve 51 sleeved movably on the crankshaft 211 and movable to connect co-rotatably with the power output gear 31, and a driving member 52 disposed fixedly on the sliding sleeve 51. The sliding sleeve 51 has an axially engaging projection 511 (see FIG. 4) that is engageable with one of the engaging holes 311 in the power output gear 31 to allow for co-rotation of the crankshaft 211 with the power output gear 31 and the sliding sleeve 51. The outer shell 7 includes a first shell half 71 and a second shell half 72 connected to the first shell half 71.

The electric driving mechanism 6 includes a switching rod 61 disposed rotatably in the outer shell 7 and rotatable in the outer shell 7 for driving the switching mechanism 5, an electric motor 62 spaced apart from the switching rod 61, a gear assembly 63 for transmitting a power from the electric motor 62 to the switching rod 61 to thereby drive operation of the switching mechanism 5, and a sensor 64 disposed on the first shell half 71. The switching rod 61 has a rod body 611 disposed rotatably on the second shell half 72, and a groove 612 formed in the rod body 611 and aligned with the driving member 52 of the switching mechanism 5. The gear assembly 63 includes a driving gear 631 driven by the electric motor 62, a position limiting gear 632 sleeved fixedly on the switching rod 61, a first speed reduction gear 633 meshing with the driving gear 631, and a second speed reduction gear 634 coaxial with and connected fixedly to the first speed reduction gear 633 and meshing with the position limiting gear 632.

The sensor 64 is disposed for detecting the rotary position of the one of the gears 631, 632, 633, 634 of the gear assembly 63 to emit a position signal to the electric control unit 9. The electric motor 62 is, but not limited to a DC motor.

The positioning unit 8 includes a position limiting member 81 disposed in the outer shell 7, and an elongate engaging portion 82 disposed at the position limiting gear 632 and engaging the position limiting member 81. The engaging portion 82 has opposite first and second engaging ends 821, 822. The electric motor 62 is operable to rotate the one of the gears 631, 632, 633, 634 of the gear assembly 63 relative to the outer shell 7 between a non-supplying position shown in FIG. 3 and a supplying position shown in FIG. 5.

The electric control unit 3 is operable for driving operation of the electric motor 62 when receiving the position signal from the sensor 64. To be more specific, when the sensor 64 detects that the one of the gears 631, 632, 633, 634 of the gear assembly 63 is rotated to either the supplying position or the non-supplying position, rotation of the electric motor 62 is stopped under control of the electric control unit 3.

At the non-supplying position, the position limiting member 81 is engaged with the first engaging end 821, and the driving member 52 is biased by a spring 34 (see FIG. 4) into the groove 612 in the switching rod 61 to remove the engaging projection 511 of the sliding sleeve 51 from the one of the engaging holes 311 in the power output gear 31, so that the crankshaft 211 cannot rotate the power output gear 31.

Figure 4:
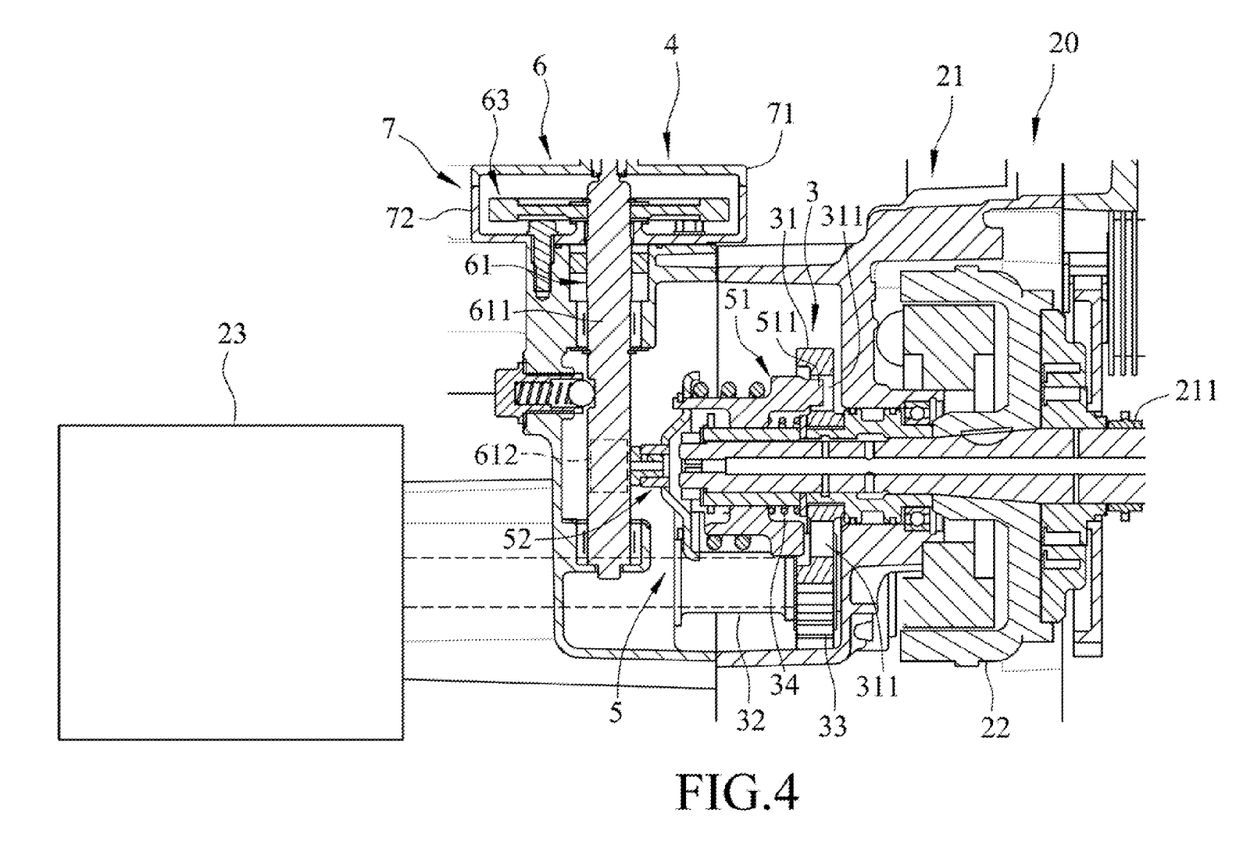
FIG. 4 is a sectional view of the first embodiment, illustrating a supplying position of the switching mechanism.
Figure 5:
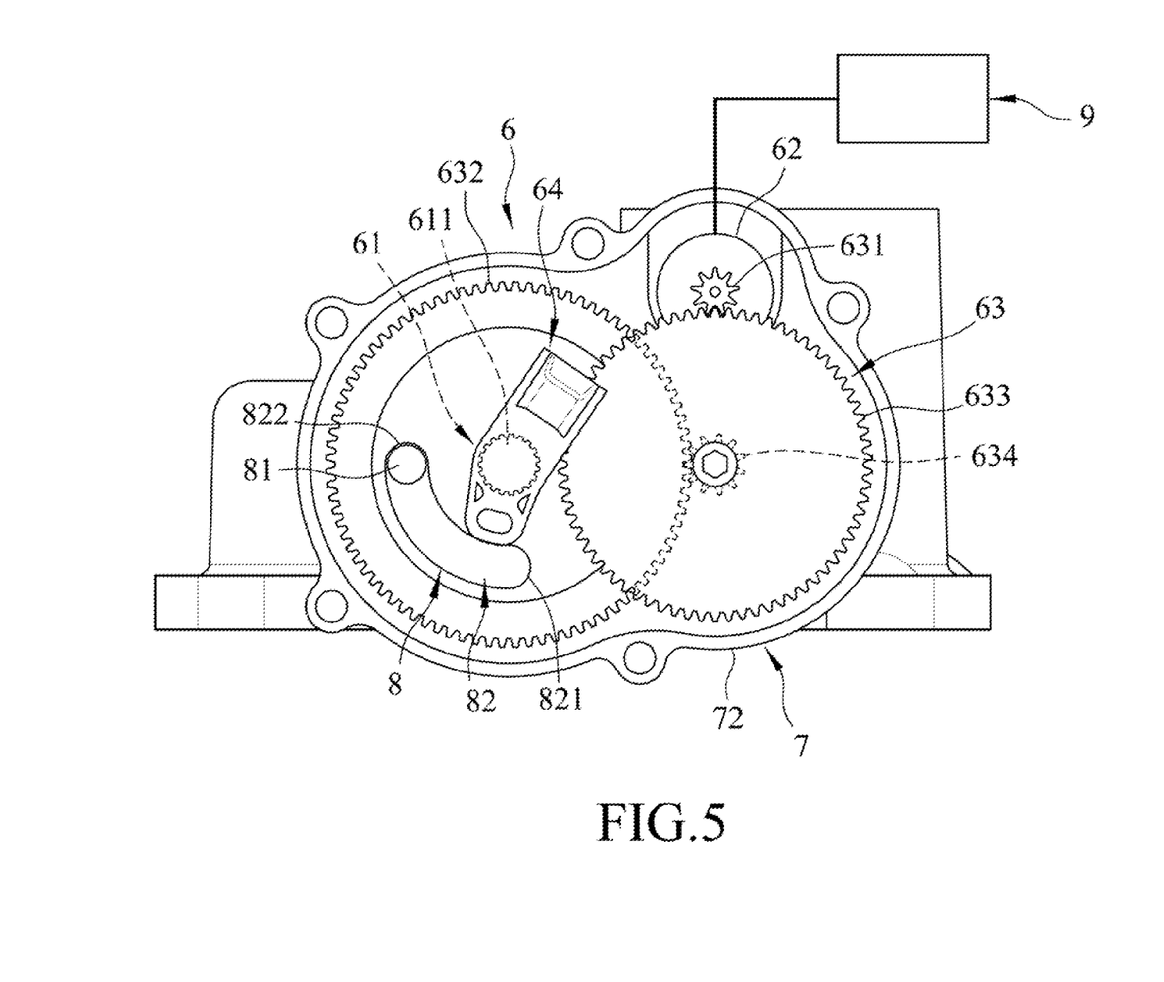
FIG. 5 is a top view of the first embodiment, illustrating that a position limiting member is engaged in a second engaging end of an engaging portion when the switching mechanism is disposed at the supplying position.

With further reference to FIGS. 4 and 5, at the supplying position, the position limiting member 81 is engaged with the second engaging end 822, and driving member 52 is disengaged from the groove 612 in the switching rod 61 and abut against the rod body 611 to engage the engaging projection 511 of the sliding sleeve 51 with the one of the engaging holes 311 in the power output gear 31, so that the crankshaft 211 can rotate the power output gear 31 to thereby activate the power transmitting mechanism 32 and the power generator 23 for supplying electricity to the external electric appliances.

Figure 6:
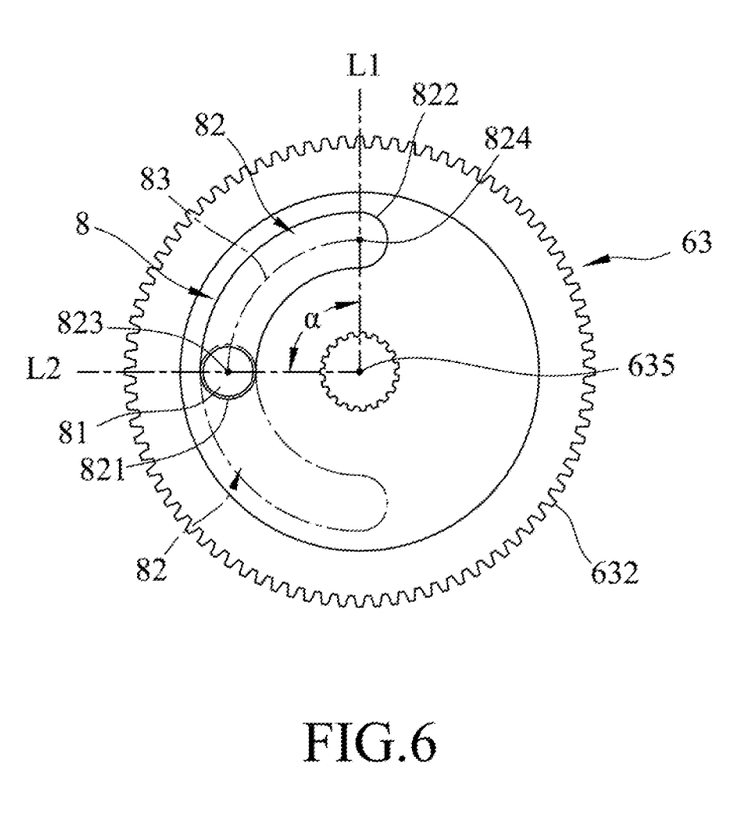
FIG. 6 is a fragmentary schematic view of the first embodiment, illustrating that the position limiting member is movable within the engaging portion along a curved path that extends in a position limiting gear by about 90°.

With further reference to FIG. 6, the engaging portion 82 of the positioning unit 3 is configured as a curved slide slot, and has a central line 83 along length of the curved slide slot. Any point of the central line 63 is spaced apart from a central point of the position limiting gear 632 of the gear assembly 63 at a predetermined distance (i.e., the curvature radius of the central line 83). The curved slide slot 82 has two rounded ends constituting the first and second engaging ends 821, 822 and each having a central point 823, 824. A straight line (L1) extending through the central point of the position limiting gear 632 and the central point 623 of the second engaging end 622 is perpendicular to another straight line (L2) extending through the central point of the position limiting gear 632 and the central point 823 of the first engaging end 821.

The position limiting member 81 is configured as a projecting rod extending from an inner surface of the second shell half 72, and is movable within the engaging portion 82 along a curved path that extends in a position limiting gear 632 by an angle α. In this embodiment, the angle is, but not limited to about 90°.

Figure 7:
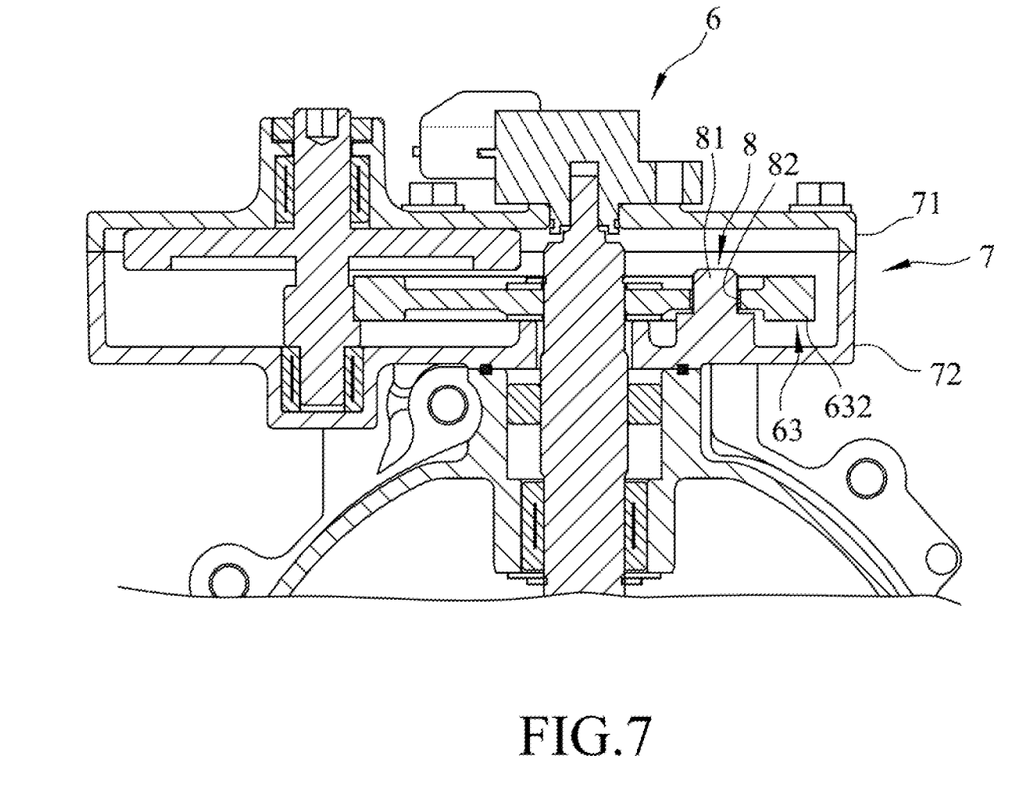
FIG. 7 is a fragmentary sectional view of the first embodiment, illustrating a positioning unit.
Figure 8:
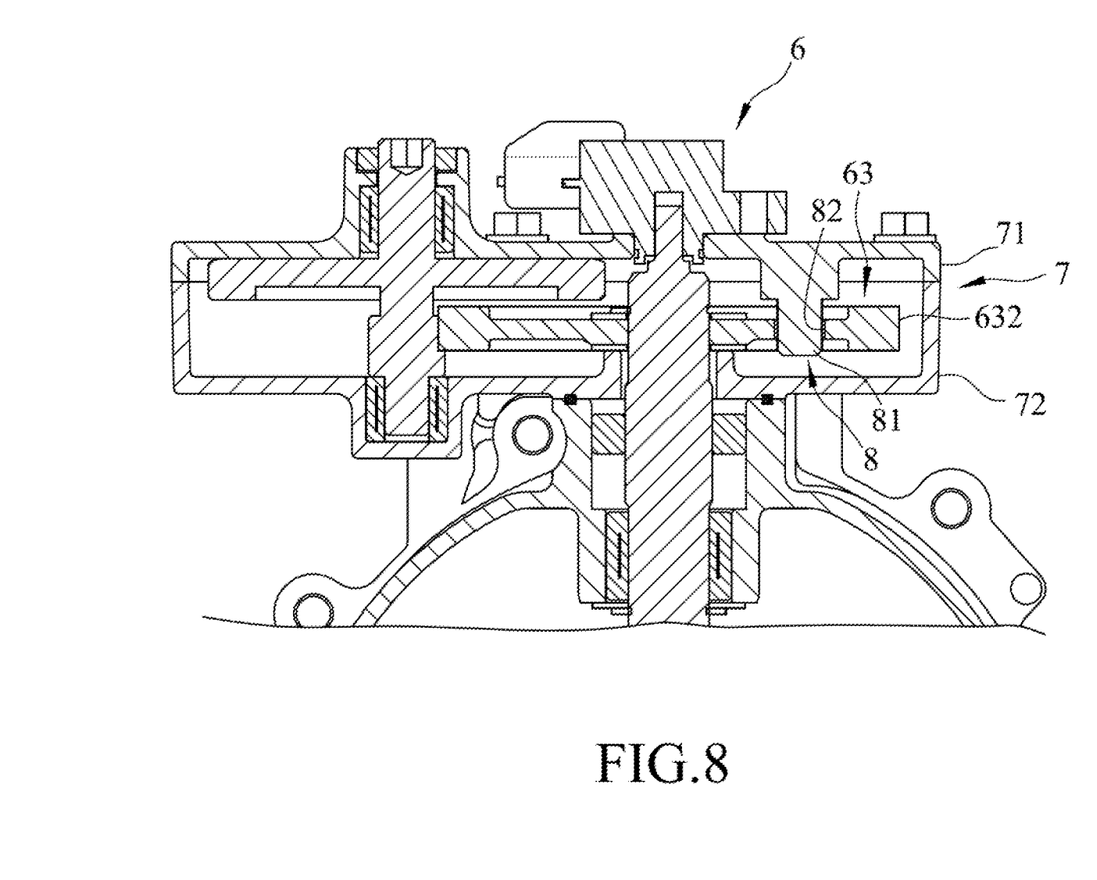
FIG. 8 is a sectional view illustrating a modified positioning unit.
Figure 9:
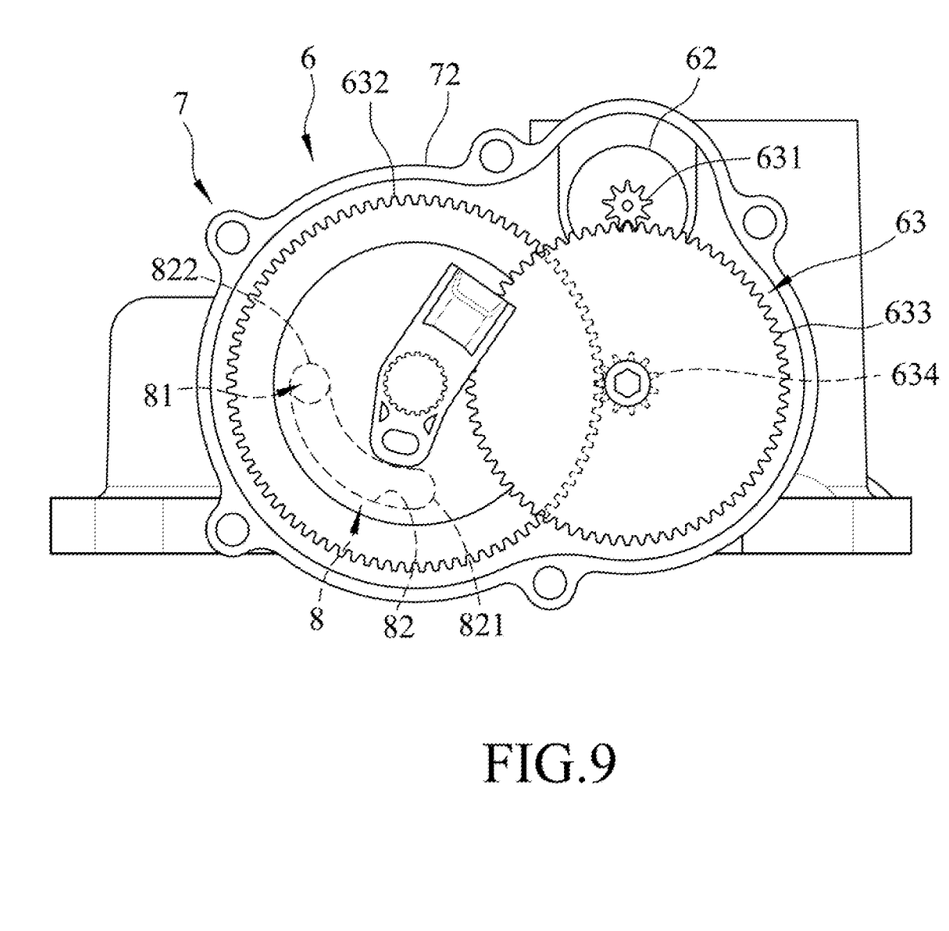
FIGS. 9 and 10 are respectively a top view and a sectional view illustrating another modified positioning unit.
Figure 10:
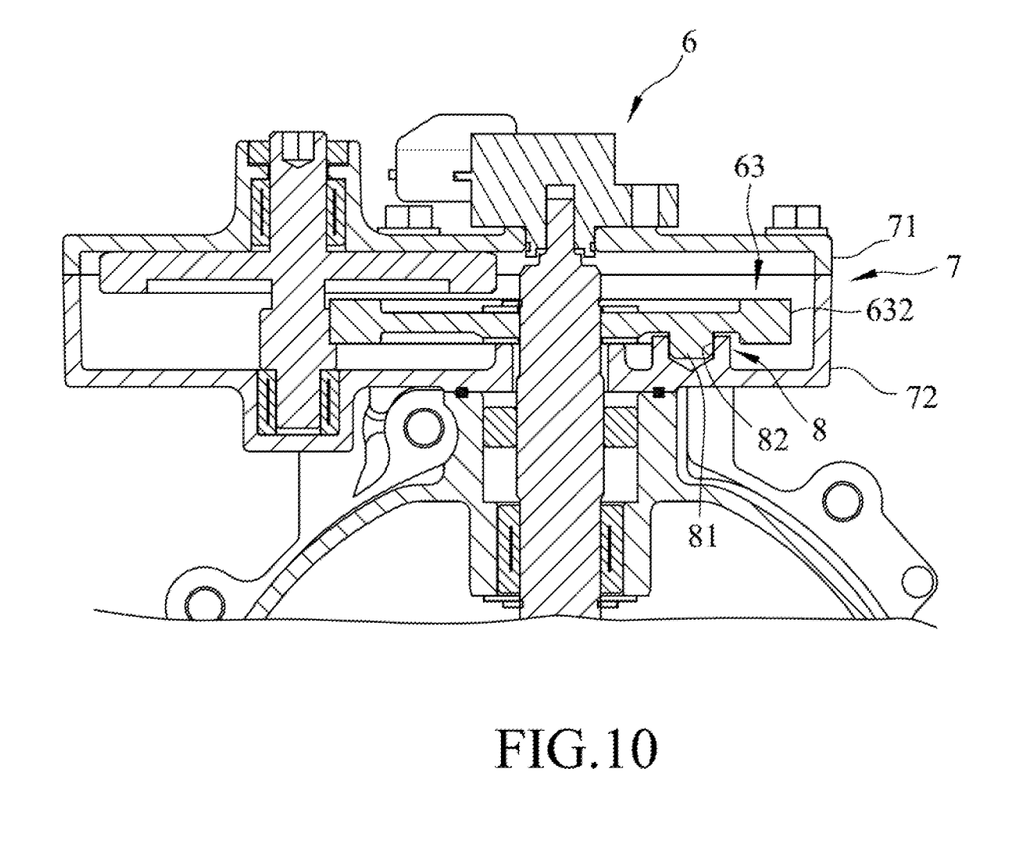

It should be noted that, with particular reference to FIGS. 5 and 7, in this embodiment, as described above, the engaging member 82 is a slide slot formed in the position limiting gear 632, and the position limiting member 81 is a projecting rod extending from the inner surface of the second shell half 72. The positioning unit 8 may be modified. For example, as shown in FIG. 6, unlike the first embodiment, the position limiting member 81 of a modified positioning unit 8 extends from an inner surface of the first shell half 71. Or, as shown in FIGS. 9 and 10, the positioning unit 8 may be modified such that, the position limiting member 82 is configured as a slide slot formed in the inner surface of the second shell half 72, while the engaging portion 81 is configured as a projecting rod, which is disposed on the position limiting gear 632, which extends movably into the slide slot, and which is movable along the slide slot 82 between the first and second engaging ends 811, 812.

With particular reference to FIGS. 3 and 5, when the position limiting member 81 is moved to either the first engaging end 821 or the second engaging end 822, the sensor 64 sends the position signal to the electric control unit 9 such that, when the electric control unit 9 receives the position signal, it stops rotation of the electric motor 62, thereby maintaining effectively the one of the gears 631, 632, 633, 634 at the non-supplying position or the supplying position. With particular reference to FIGS. 4 and 5, the electric motor 62 has a characteristic of high rotational speed to rotate quickly the one of the gears 631, 632, 633, 634 of the gear assembly 63 to the supplying position or the non-supplying position, so as to activate the switching mechanism 5 to control transmission of power from the crankshaft 211 to the power generator 23, thereby allowing the power generator 23 to generate electricity (i.e., the power generator 23 can work).

In view of the above, due to presence of the positioning unit 8, operation of the electric motor 62, the gearing assembly 63, and the switching rod 61 can be controlled effectively.

With this invention thus explained, it is apparent that numerous modifications and variations can be made without, departing from the scope and spirit of this invention. It is therefore intended that this invention be limited only as indicated by the appended claims.

What is claimed is:

1. A power transmission control apparatus for use with a vehicle, the vehicle including an engine having a crankshaft, an alternator disposed on the crankshaft, and a power generator for supplying electricity to an external electric appliance, said power transmission control apparatus that controls transmission of a power from the crankshaft to the power generator, said power transmission control apparatus comprising:

a power transmitter that is connected to the crankshaft and transmits the power from the crankshaft to the power generator, the power transmitter includes a transmission gear train;

a switching unit that controls torque transmission from the crankshaft to the transmission gear train activation and deactivation of said transmission gear train of said power transmitter, said switching unit includes a clutch that is connected between the crankshaft and said transmission gear train of said power transmitter, an electric driving mechanism that drives said clutch, and an outer shell receiving said electric driving mechanism, said electric driving mechanism that includes a switch rod disposed rotatably in said outer shell and rotatable in said outer shell to drive said clutch, an electric motor spaced apart from said switch rod, and a gear assembly that includes a plurality of gears that transmit power from said electric motor to said switch rod that drives operation of said switch;

a positioning unit that includes a projecting rod disposed at said outer shell in such a manner that said projecting rod is configured not to extend through said outer shell, and an elongate engaging portion disposed at said gear assembly and engaging said projecting rod, said engaging portion having opposite first and second engaging ends, said electric motor operable to rotate one of said gears of said gear assembly relative to said outer shell between a non-supplying position, where said projecting rod is engaged with said first engaging end and where the crankshaft cannot drive said transmission gear train of said power transmitter, and a supplying position, where said projecting rod is engaged with said second engaging end and where the crankshaft can drive said transmission gear train of said power transmitter; and an electric control unit that drives operation of said electric motor, said electric driving mechanism of said switching unit further includes a sensor disposed on said outer shell to detect a rotary position of said one of said gears of said gear assembly that emits a position signal to said electric control unit such that, when said sensor detects said one of said gears of said gear assembly is rotated to either said supplying position or said non-supplying position, rotation of said electric motor is stopped under control of said electric control unit.

2. The power transmission control apparatus as claimed in claim 1, wherein said gears of said gear assembly include a driving gear driven by said electric motor, and a position limiting gear sleeved fixedly on said switch rod.

3. The power transmission control apparatus as claimed in claim 2, wherein said outer shell includes a first shell half and a second shell half connected to said first shell half, said engaging portion of said positioning unit being configured as a slide slot formed in said position limiting gear, said projecting rod extending from an inner surface of said first shell half, being inserted movably into said slide slot, and being movable along said slide slot between said first and second engaging ends.

4. The power transmission control apparatus as claimed in claim 2, wherein said outer shell includes a first shell half and a second shell half connected to said first shell half, said engaging portion of said positioning unit being configured as a slide slot formed in said position limiting gear, said projecting rod extending from an inner surface of said second shell half, being inserted movably into said slide slot, and being movable along said slide slot between said first and second engaging ends.

5. The power transmission control apparatus as claimed in claim 2, wherein said engaging portion of said positioning unit is configured as a curved slide slot, and has a central line along a length of said curved slide slot, any point of said central line being spaced apart from a central point of said position limiting gear at a predetermined distance.

6. The power transmission control apparatus as claimed in claim 5, wherein said curved slide slot has two rounded ends each having a central point, a straight line extending through said central point of said position limiting gear and said central point of one of said rounded ends being perpendicular to another straight line extending through said central point of said position limiting gear and said central point of the other of said rounded ends.

7. The power transmission control apparatus as claimed in claim 2, wherein said gears of said gear assembly further include a first speed reduction gear meshing with said driving gear, and a second speed reduction gear coaxial with and connected fixedly to said first speed reduction gear and meshing with said position limiting gear.

8. The power transmission control apparatus as claimed in claim 1, wherein said electric motor of said electric driving mechanism is configured as a DC motor.

* * * * *